Figure 1:
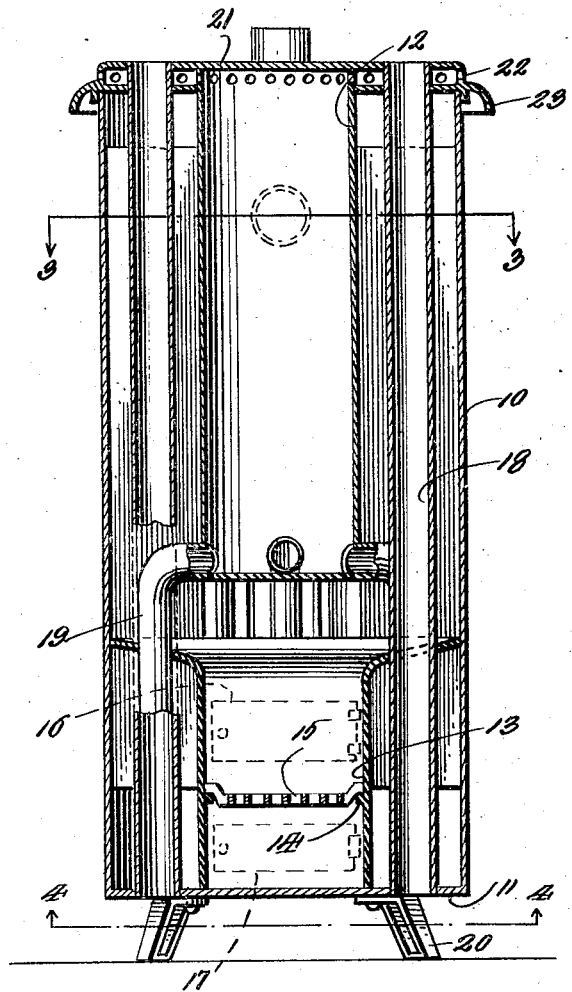

March 1, 1927.
W. E. TOLER
STOVE
Filed Nov. 23, 1925

1,619,166

2 Sheets-Sheet 1

WITNESSES
Guy M. Spring

Inventor
WILLIAM E. TOLER

By Richard B. Owen
Attorney

March 1, 1927.
W. E. TOLER
STOVE
Filed Nov. 23, 1925   2 Sheets-Sheet 2
1,619,166
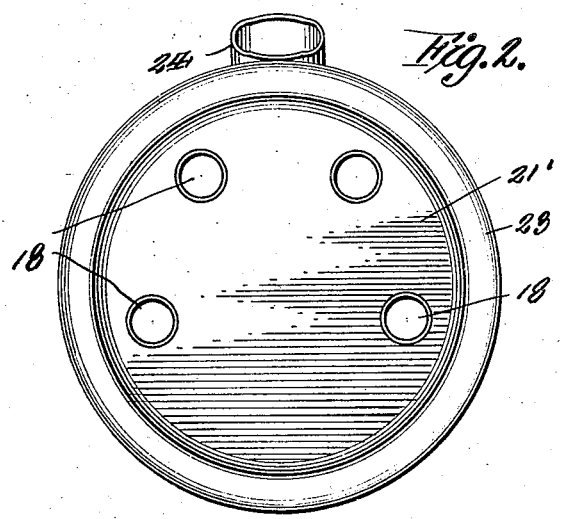
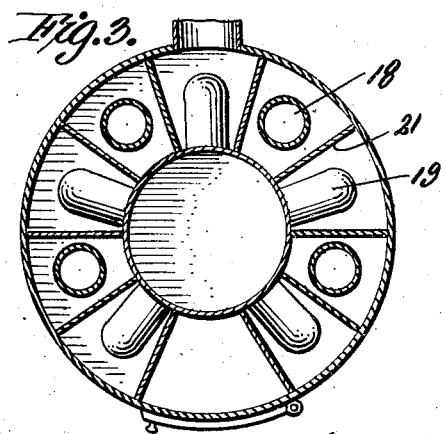
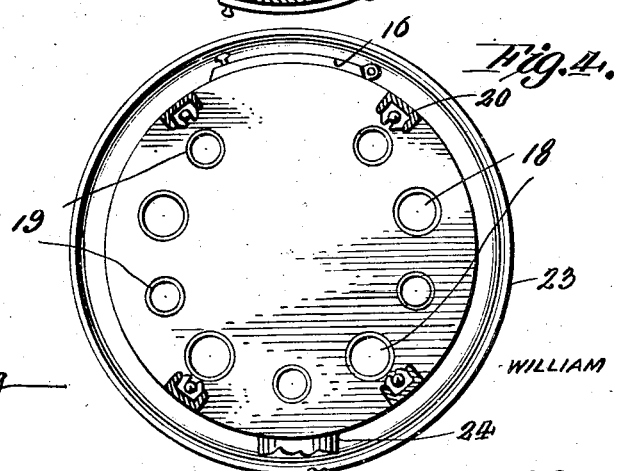
Inventor
WILLIAM E. TOLER Patented Mar. 1, 1927.

1,619,166

UNITED STATES PATENT OFFICE.

WILLIAM E. TOLER, OF PAWNEE, OKLAHOMA.

STOVE.

Application filed November 23, 1925. Serial No. 70,940.

This invention relates to improvements in heating apparatus and has particular reference to an improved stove or furnace.

An important object of the invention is the provision of a stove designed so as to obtain the utmost heating efficiency for heating the interior of dwellings and the like.

A further object of the invention is to provide a stove arranged so as to produce the maximum circulation and radiation efficiency.

Another object of the invention is the provision of a stove designed so as to obtain the utmost heating efficiency from the fuel.

A still further object of the invention is the provision of a stove of comparatively simple yet durable construction designed so as to be placed upon the market at a reasonable cost.

Other objects and advantages of this invention will become apparent as the description progresses.

In the accompanying drawings forming a part of this application and in which like numerals are employed to designate corresponding parts throughout the same:

Figure 1 is a longitudinal sectional view through a stove constructed in accordance with my invention, Figure 2 is a top plan view of the same, Figure 3 is a transverse sectional view taken on the line 3—3 of Figure 1, and Figure 4 is a bottom plan view taken on the line 4—4 of Figure 1.

In the drawings, wherein for the purpose of illustration is shown the preferred embodiment of my invention, the numeral 10 generally indicates the outer casing of my improved stove preferably of longitudinal cylindrical formation constructed of durable metal. The lower extremity of the casing or shell 10 is enclosed by a circular bottom plate 11 while the upper end is open.

Arranged in the upper central portion of the casing 10 concentric with the outer casing is an inner cylindrical casing 12 perforated adjacent its upper end. This member is disposed in spaced relation above a cylindrical structure 13 forming the fire pot, the lower end of the fire pot 13 resting upon the bottom of the outer casing 12 while the upper extremity flares outwardly and contacts with the side walls of the outer shell. This fire pot is of decreased diameter and arranged concentrically with the outer casing and is preferably constructed of fire clay or suitable material. The interior of the fire pot 13 is provided with a plurality of circularly arranged lugs 14 upon which a common form of grate 15 is mounted.

With particular reference to Figures 1 and 4, it will be seen that the outer casing carries a fuel door 16 which is in transverse alignment with an opening formed in the fire pot. A feed chute extends between the door 16 and the opening formed in the fire pot. As is customary, an ash door 17 is also provided, the structure in this instance being similar to the formation of the fuel door structure. Mounted in the annular chamber formed between the inner and outer casings are a plurality of vertical air conducting pipes 18 arranged in spaced relation in the annular chamber. These pipes extend from the lower closed end of the outer casing to a position projecting above the upper end. Arranged in alternate relation with the pipes 18 are a plurality of comparatively short pipes 19 preferably of smaller diameter extending from the lower closed end of the casing and bent in an arc at the upper extremity so as to communicate with the inner casing 12. The pipes 19 connect with the lower extremity of the inner casing and communicate with the interior thereof so as to permit free circulation of air therethrough.

The entire structure is supported by a plurality of feet 20, in the present instance four, arranged in spaced relation and detachably secured to the bottom plate 11.

As will be readily noted with reference to Figures 1 and 3, a plurality of vertical partitions 21 are secured between the inner and outer casings, these partitions being disposed between the circulating pipes 18 and 19. The partitions 21 terminate at a spaced distance from the top and bottom of the heater to conduct the heated air vertically upward in the intermediate portions of the stove adjacent the conducting pipe 18 and 19, and permit distribution of the air at the upper and lower ends to maintain a constant pressure and temperature.

Mounted on the upper end of the stove is a hollow cover 21 composed of a pair of metallic plates of circular formation arranged in spaced relation and connected by an annular ring 22. This ring is perforated to permit convenient circulation of the air. Formed on the outer periphery of the hollow cover is an arcuate downwardly extending flange 23, the structure being so arranged as to permit convenient disconnection. It will be noted, with reference to Figure 1, that the vertical circulating pipes 18 extend through apertures formed in the hollow cover and communicate with the atmosphere.

In operation, the air circulating through the conducting pipes 18 and 19 and in the central chamber of the stove is quickly heated and passes upward while the smoke from the fire pot circulates in the chamber formed between the inner and outer casings. This smoke is conducted through a smoke pipe 24 communicating with the outer casing adjacent the upper end. It is obvious, from the construction shown and described, that the air entering the conducting pipes is heated and elevated and distributed through the hollow cover 21. It is contended that the particular construction embodied in applicant's stove obtains the greatest heating surface possible and thus a maximum of heating efficiency is obtained from the fuel.

It is to be understood that the form of my invention herewith shown and described is susceptible of modification and that various changes as to the shape, size and arrangement of parts may be resorted to without departing from the spirit of the invention or the scope of the subjoined claims.

Having thus described my invention, I claim:

1. A stove comprising, in combination, an outer cylindrical casing, a bottom plate enclosing the lower end of the said casing, a fire box positioned in the central lower portion of the casing flaring outwardly at its upper extremity, an interior cylindrical casing mounted in the upper central portion, a plurality of air conducting pipes extending vertically through the chamber formed between the said inner and outer casings, a plurality of shorter conducting pipes extending from the bottom plate and communicating with the lower portion of the inner casing, means for supporting the structure, and a hollow cover embodying a pair of spaced plates connected by a perforated ring, the said hollow cover being detachably mounted on the upper end of the said casings.

2. A stove comprising an outer cylindrical casing, a circular bottom plate enclosing the lower end of the said casing, a cylindrical fire box mounted in the central portion of the casing and having an outwardly flared flange at its upper end, a grate mounted in the intermediate portion of the fire box, a concentrically arranged inner casing mounted in the upper portion of the outer casing, a plurality of longitudinal pipes extending from the bottom plate to the top of the stove, a plurality of comparatively short conducting pipes extending from the bottom plate to the lower end of the inner casing and communicating therewith, a plurality of partition plates extending vertically between the casings and separating the air conducting pipes, means for supporting the said casings, and a hollow cover embodying a pair of spaced plates connected by a perforated annular ring, the said hollow cover being movably mounted on the upper end of the casings.

3. A stove comprising an outer cylindrical casing enclosed at the lower end by a circular bottom plate, supporting feet secured to the lower surface of the bottom plate and adapted to support the casing in an elevated position, a fire box mounted centrally in the lower portion of the said outer casing, a grate supported in the fire box, an inner casing arranged concentrically within the outer casing and in spaced relation therefrom, the lower end of the inner casing being enclosed by a bottom plate and having apertures formed adjacent the lower end, a plurality of longitudinal air conducting pipes extending within the outer casing in vertical arrangement spaced from the inner casing and connecting with openings formed in the bottom plate of the outer casing, a plurality of comparatively short air conducting pipes extending from the lower portion of the outer casing and having their upper ends connected with the apertures in the lower end of the inner casing and their lower ends connected with apertures in the bottom plate of the outer casing, and a hollow cover composed of a pair of horizontal spaced plates having alined openings through which the longitudinal air connecting pipes project and an annular ring connecting the plate apertured to permit the escape of hot air from the interior casing.

In testimony whereof I affix my signature.

WILLIAM E. TOLER.